April 4, 1961     H. S. TAYLOR     2,977,794
MARINE SPEEDOMETER
Filed Feb. 23, 1956     4 Sheets-Sheet 1
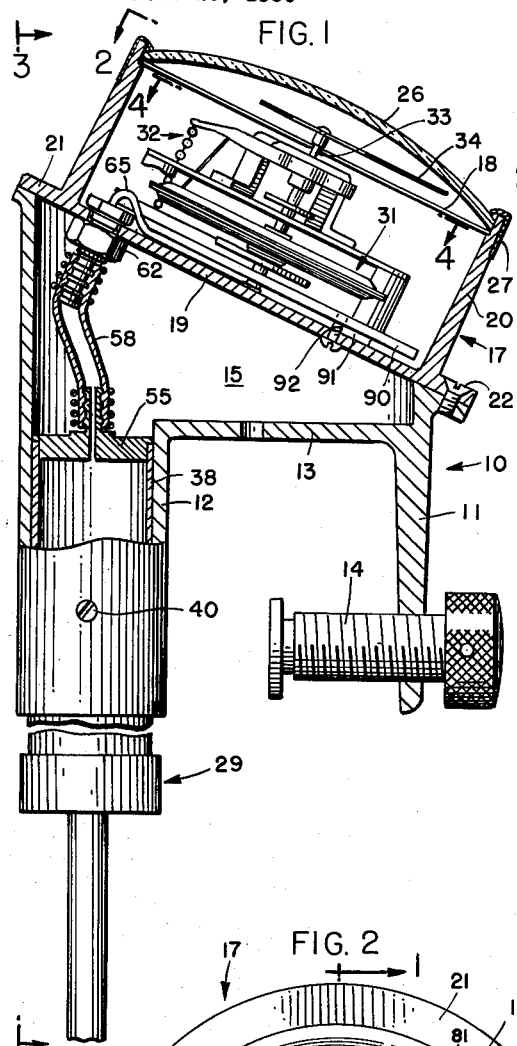
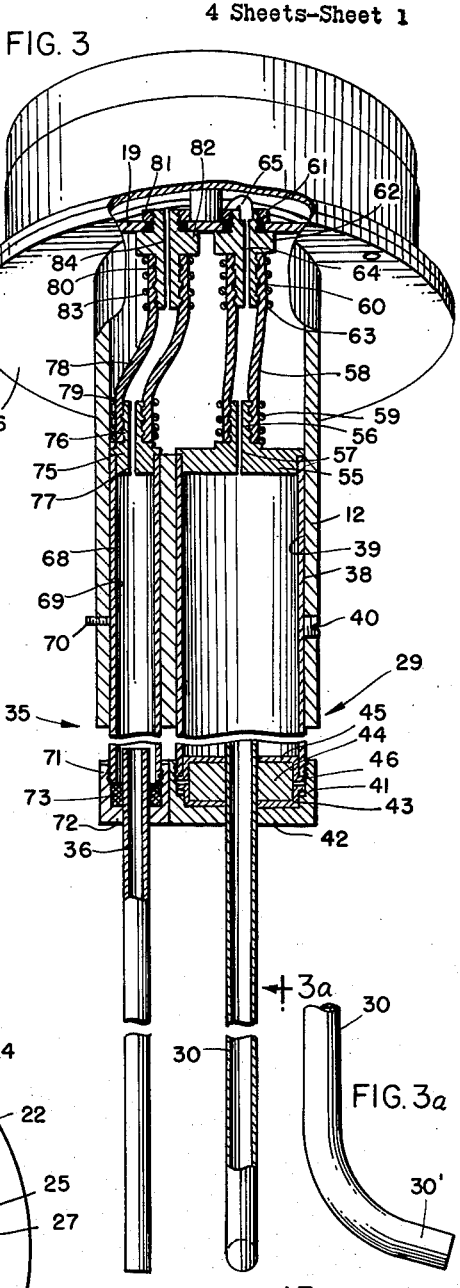
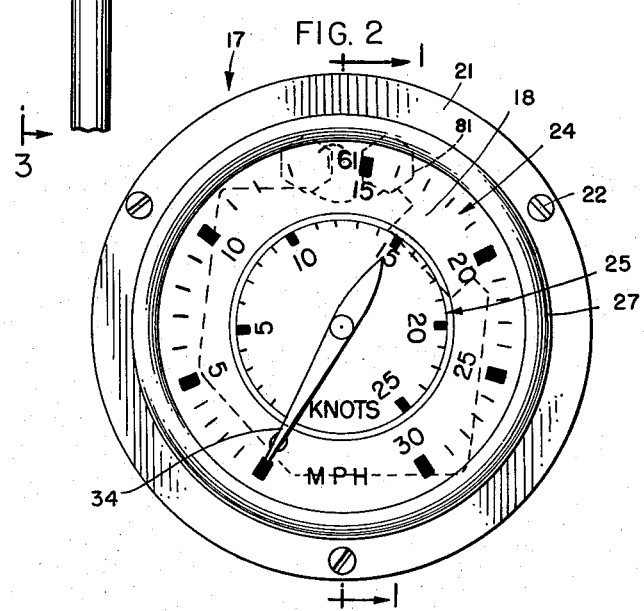
INVENTOR:
HOWARD S. TAYLOR
BY Schroeder, Hofgren,
Brady & Wegner
ATT'YS April 4, 1961 H. S. TAYLOR 2,977,794
MARINE SPEEDOMETER
Filed Feb. 23, 1956 4 Sheets-Sheet 2
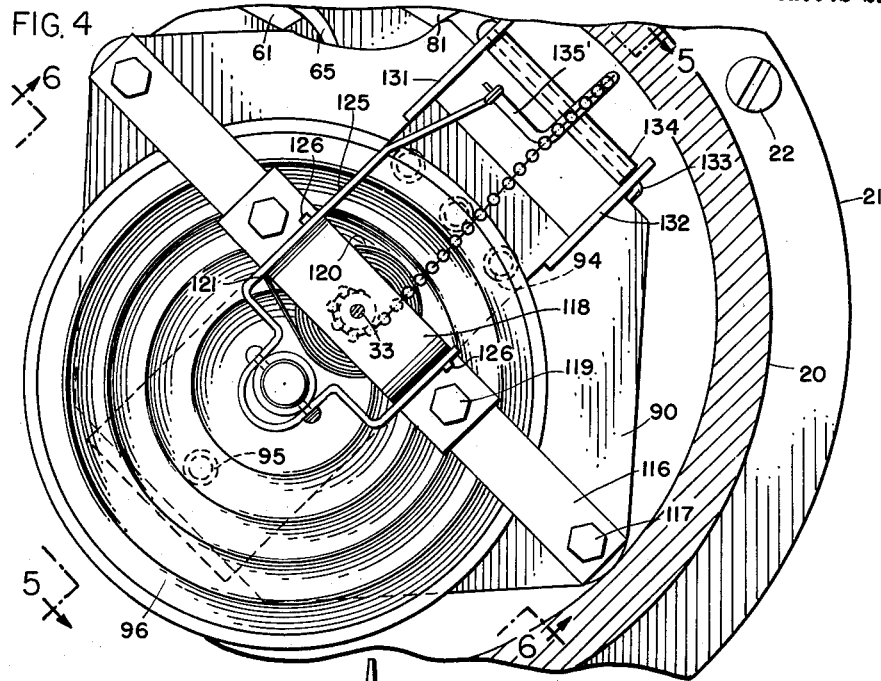
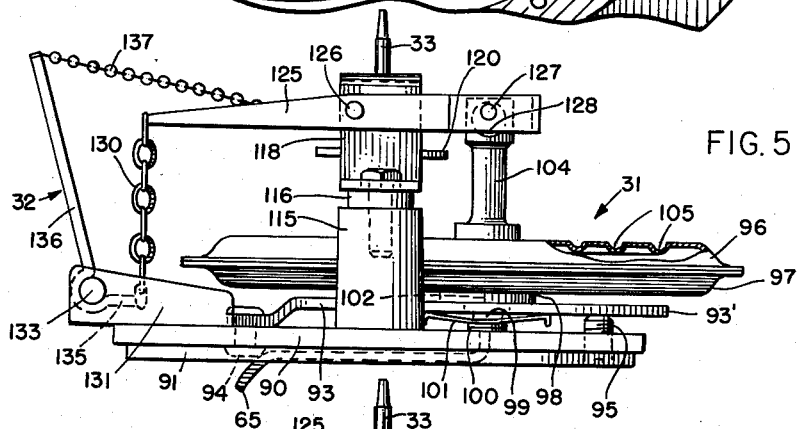
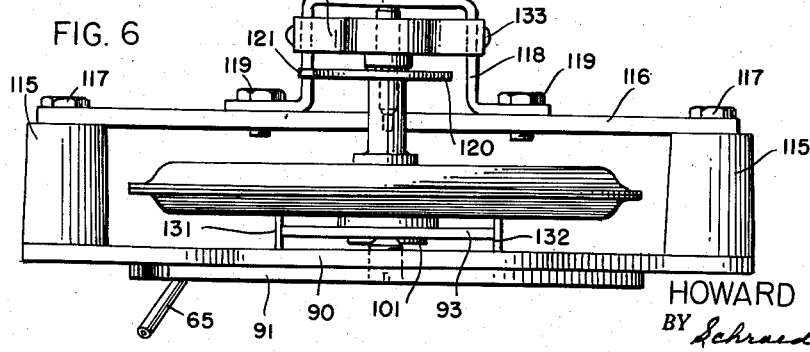
INVENTOR:
HOWARD S. TAYLOR
BY Schroeder, Hofgren,
Brady & Wegner
ATT'YS April 4, 1961 H. S. TAYLOR 2,977,794
MARINE SPEEDOMETER
Filed Feb. 23, 1956 4 Sheets-Sheet 3
FIG. 7
FIG. 9
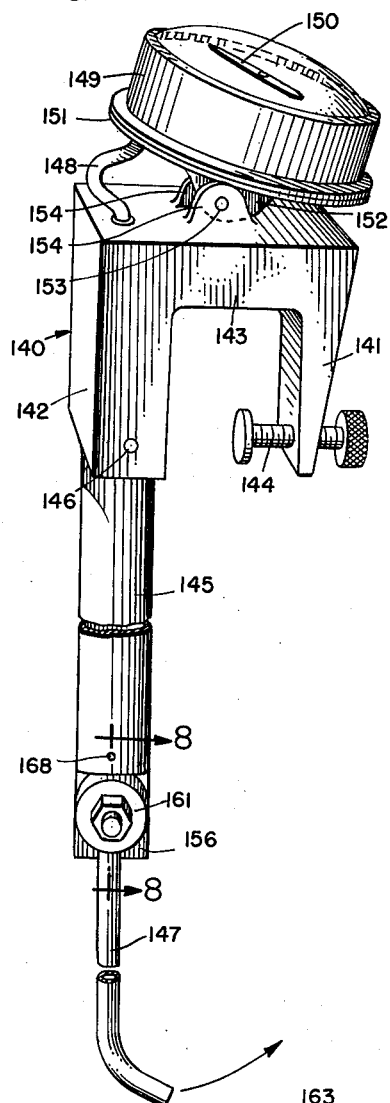
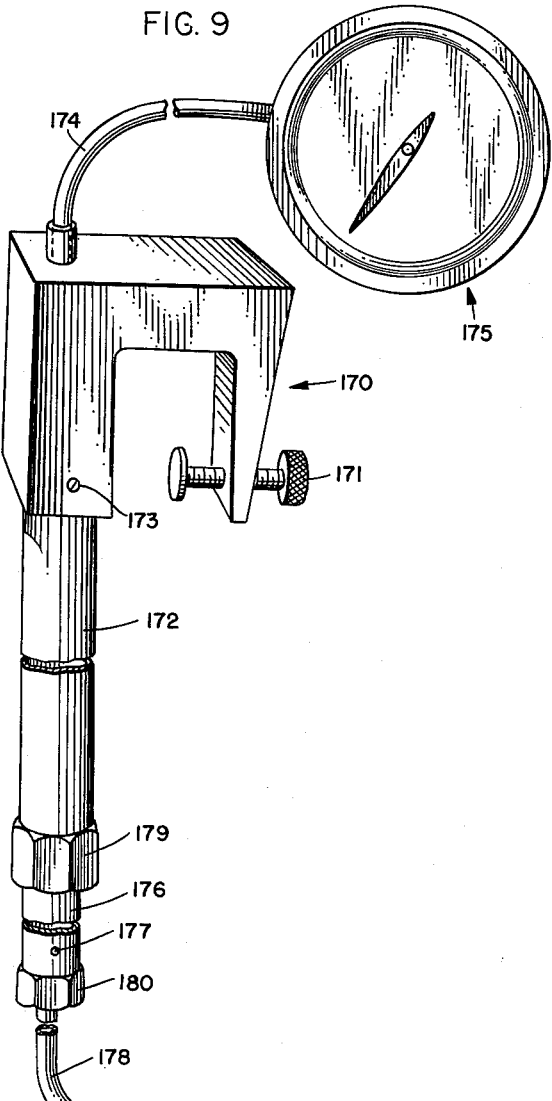
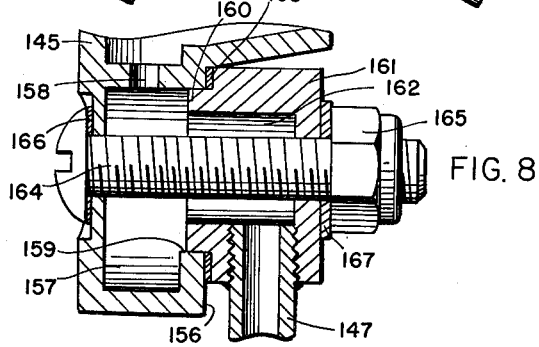
FIG. 8
INVENTOR:
HOWARD S. TAYLOR
BY Schroeder, Hofgren,
Brady & Wegner
ATT'YS April 4, 1961 H. S. TAYLOR 2,977,794
MARINE SPEEDOMETER
Filed Feb. 23, 1956 4 Sheets-Sheet 4

INVENTOR:
HOWARD S. TAYLOR
BY Schraeder, Hofgren,
Brady & Wegner
ATT'YS

United States Patent Office 2,977,794
Patented Apr. 4, 1961

2,977,794
MARINE SPEEDOMETER
Howard S. Taylor, Fox River Grove, Ill., assignor to Airguide Instrument Company, a corporation of Illinois Filed Feb. 23, 1956, Ser. No. 567,132

5 Claims. (Cl. 73—182)

This invention relates to marine speedometers and has for a general object the provision of a new and improved marine speedometer.

Marine speedometers have conventionally included an indicating device having a movable element for indicating speed or velocity of a boat or the like on which the speedometer is used, means of one kind or another for picking up the velocity pressure of the water relative to the moving vessel, and means for converting variations in velocity pressure to movement of the indicating element. However, velocity pressure varies as the square of variations in speed of the water relative to the moving boat, and if equal units of variation in velocity pressure are converted into equal increments of movement, such increments of movement vary as the square of the units of velocity variation. If, then, such increments of movement are transmitted to the movable indicating element, such as a pointer moving angularly over a speedometer dial, the dial must be calibrated in increments varying as the square of velocity variations. For example, in such a device, there may be no angular movement of the pointer at a speed of 5 miles per hour; in an increase of speed from 5 m.p.h. to 10 m.p.h. the pointer may move through an angle of about 13°; in an increase of speed from 10 m.p.h. to 20 m.p.h., the pointer may move through an additional angle of about 40°; and in an increase of speed from 40 m.p.h. to 45 m.p.h., the pointer may move through an angle of about 57°. Generally, the graduations on such a speedometer dial correspond roughly to a logarithmic scale. Obviously, there are certain disadvantages with such an arrangement.

With the above and other considerations in mind, it is an object of this invention to provide a marine speedometer having means for effecting movement of the indicating element in approximately uniform increments corresponding generally to equal units of speed variation.

A more specific object is to provide a new and improved marine speedometer including an indicating device, having a movable element for indicating speed, a Pitot tube adapted to extend into water during movement of the boat or the like for sensing velocity pressure, and pressure sensitive means responsive to variations in velocity pressure for effecting movement of the movable element of the indicating device in increments generally proportional to the square root of velocity pressure variations so that movement of the movable indicating element is generally proportional to units of speed variation, rather than being proportional to the square of velocity variations.

Another object is to provide a new and improved marine speedometer having a pressure sensitive device for controlling the movable element of an indicating device, a Pitot tube for picking up velocity pressure, and a tube of enlarged diameter relative to the Pitot tube connecting the Pitot tube and the pressure sensing device so as to form a stabilizing chamber between the Pitot tube and the pressure sensitive device.

A further object is to provide a new and improved speedometer of the character described in the preceding paragraph wherein the Pitot tube is extensible relative to the enlarged tube.

Another object is to provide a new and improved speedometer of the character described wherein the enlarged tube is formed with an outlet opening to atmosphere adapted to ride above the water level, and wherein the enlarged tube is extensible relative to the pressure sensing device so that the outlet opening may be properly positioned relative to the water level.

It is also an object of the invention to provide a new and improved speedometer of the character described wherein the Pitot tube is pivotally mounted on the enlarged tube for movement about an axis normal to the axis of the enlarged tube so that the Pitot tube will yield by pivotal movement on striking objects in the water.

A further object is to provide a marine speedometer of the character described wherein velocity pressure is applied internally of the pressure sensitive device, and the pressure sensitive device is housed in a pressure tight case, and the speedometer includes a static pressure tube adapted to extend into the water to subject the exterior of the pressure sensitive device to static pressure so as to provide a higher degree of accuracy in indicating speed.

Other objects and advantages will become readily apparent from the following detailed description taken in connection with the accompanying drawings, in which:

Fig. 1 is a fragmentary side elevational view of a marine speedometer constructed according to the principles of the present invention, having portions broken away to show the interior of the speedometer;

Fig. 2 is a top plan view of the dial face of the speedometer illustrated in Fig. 1, taken at about the line 2—2 of Fig. 1;

Fig. 3 is a rear elevational view of the speedometer illustrated in Fig. 1, taken at about the line 3—3 of Fig. 1, and having portions broken away to better illustrate the interior of the speedometer;

Fig. 3a is a fragmentary elevational view, taken at about the line 3a—3a of Fig. 3, illustrating the profile of the Pitot tube;

Fig. 4 is an enlarged, fragmentary sectional view taken at about the line 4—4 of Fig. 1, illustrating the mechanism inside the speedometer which responds to velocity pressure variations for effecting angular movement of the pointer about the speedometer dial;

Fig. 5 is an elevational view of the mechanism illustrated in Fig. 4, taken at about the line 5—5 of Fig. 4;

Fig. 6 is an elevational view of the mechanism illustrated in Figs. 4 and 5, taken at about the line 6—6 of Fig. 4;

Fig. 7 is a perspective view illustrating a modification of the speedometer;

Fig. 8 is an enlarged fragmentary sectional view taken at about the line 8—8 of Fig. 7;

Fig. 9 is a perspective view illustrating another modification of the speedometer;

Figure 10:
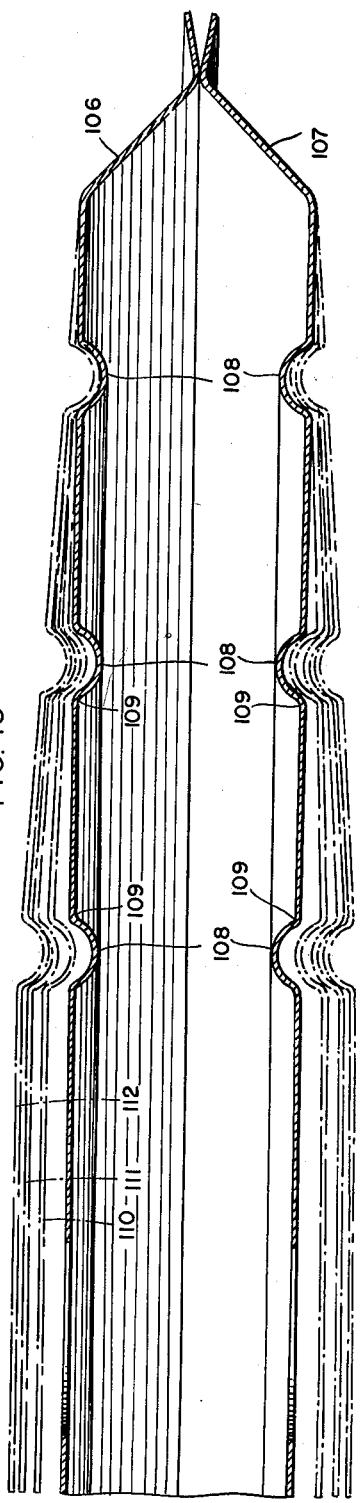
Fig. 10 is an enlarged fragmentary sectional view taken through a diaphragm-formed pressure-tight chamber adapted for use in my speedometer, illustrating graphically the movement responses of the diaphragm to added increments of velocity pressure.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Referring now to Figs. 1, 2 and 3 particularly, the invention is illustrated in connection with a speedometer including a mounting bracket 10 of generally U-shaped configuration which includes a relatively thin leg 11 and a relatively thicker leg 12 which are connected by a transversely extending connecting member 13. The mounting bracket 10 is thus formed to fit on a part of a boat such as a transom, and the leg 11 carries a clamping screw 14 which may be utilized to secure the bracket in a suitable position on a boat. The mounting bracket 10 includes a hollow portion 15 extending upwardly from the connecting portion 13 and having a width comparable to the width of the legs 11 and 12, as seen in Fig. 3, and extending in a front to rear direction from the leg 11 to the rear of the leg 12, as seen in Fig. 1. The upper terminus of the hollow portion 15 is inclined at an angle downwardly toward the front of the speedometer, as seen in Fig. 1, and includes an integral plate 16 having a circular periphery, as seen in Fig. 3, and also being inclined to form a support for a speedometer case generally designated 17 so that the speedometer may be mounted on the plate 16 with the dial 18 inclined toward the viewer so as to be readily visible.

The case 17 includes a flat circular plate 19 forming a bottom wall and having upstanding thereon a cylindrical sidewall 20 whose diameter is somewhat less than that of the bottom plate 19 to leave an outer annular flange 21 on the plate 19 for receiving screws such as that indicated at 22 to secure the case 17 on the mounting bracket 10. Adjacent the upper terminus of the sidewall 20, it is recessed internally to form a shoulder which supports the circular dial 18 at its periphery. As seen in Fig. 2, the dial 18 may be provided with an outer scale 24 having graduations calibrated to indicate speed in miles per hour, and an inner scale 25 having graduations calibrated to indicate speed in knots. The dial 18 is retained in position by a transparent cover 26 of material such as glass. Adjacent its upper terminus the cylindrical sidewall 20 of the speedometer case is recessed externally to receive an annular retainer sleeve 27 tightly fitted on the wall 20 and having its upper end turned radially inwardly to overlie and engage the transparent cover 26 to secure the cover in position. The sleeve 27 may be secured to the wall 20 by adhesive means, and the dial 18, the cover 26, and the sleeve 27 form a pressure-tight closure so that the case 17 is sealed for a purpose described more fully hereinafter.

As seen in Figs. 1, 3 and 3a, the mounting bracket 10 supports tubular means generally designated 29 including a Pitot tube 30 adapted to extend into water during movement of the vessel to subject the interior of a pressure sensitive device 31, in the case 17, to velocity pressures. The case 17 also houses a mechanism 32 responsive to the pressure sensitive device 31 for effecting movement of a pointer shaft 33 in response to variations in velocity pressure. The pointer shaft 33 extends upwardly in the case 17 through the center of the dial 18 and at its upper end carries a pointer 34 adapted for angular movement over the scales 24 and 25 on the dial 18. The mounting bracket 10 also supports tubular means 35 (Fig. 3) including a static pressure tube 36 adapted to subject the interior of the case 17 and thus the exterior of the pressure-sensitive device 31 to static pressure.

As seen best in Figs. 1 and 3, the tubular means includes a tube 38 fitted in a bore 39 in the leg 12 of the bracket 10 and retained by a set screw 40. The lower end of the tube 38 receives the Pitot tube 30 telescoped therein for adjustment angularly or longitudinally relative to the tube 38. A locking sleeve 41 on the Pitot tube is threadable on the lower end of the tube 38 and is formed with an inwardly turned annular flange 42 closely fitting the Pitot tube and receiving a cup-shaped clamping member 43 which in turn receives a compressible washer 44 on the Pitot tube. An upper cup-shaped clamping member 45 fits over the top of the washer 44 and is formed with an outwardly turned annular flange 46 which abuts against the lower end of the tube 38. In this manner, the washer 44 is confined at its outer periphery and at its ends so that when the locking sleeve 41 is threaded on the tube 38, the washer is compressed against the Pitot tube to form a pressure-tight joint, securing the Pitot tube in position.

The upper end of the relatively large tube 38 is closed by a plug 55 formed with an externally ribbed nipple 56 and a passage 57 leading to the exterior of the tube 38. A length of flexible tubing 58, of material such as plastic, is tightly fitted on the nipple 56 and may be held by means of a coiled spring 59 encircling the tube on the nipple. The plate 19 forming the bottom wall of the case 17 is fashioned with an opening adapted to receive a tubular fitting 60 formed near the top with an annular flange 62 abutting against the under surface of the plate 19. Above the flange, the fitting 60 is threaded externally to receive a lock nut 61 for securing the fitting in place. The lower end of the fitting 60 is ribbed externally and receives thereon the upper end of the flexible tube 58 which may be retained in place by a coiled spring 63. The upper end of a passage 64 through the tubular fitting 60 receives the end of a tube 65 which may be secured in position by solder, for example, and which leads to the interior of the pressure-sensitive device 31 for converting variations in velocity pressure to increments of movement for use in effecting movement of the pointer 34 relative to the dial 18.

The tubular means 35, referred to above, for transmitting static pressure to the inside of the case 17 includes a tube 68 closely fitted in a bore 69 formed in the relatively thick leg of the mounting bracket 10 and retained in position by a set screw 70. Adjacent its lower end, the tube 68 receives the static pressure tube 36 therein for adjustment angularly and longitudinally relative to the tube 69. A locking sleeve 71 carried on the static pressure tube 36 is formed with an inwardly turned flange 72 which receives a compressible washer 73 adapted to abut against the lower end of the tube 68 so that when the sleeve 71 is threaded up on the tube 68, the washer 73 is compressed against the static pressure tube 36 to form a sealed joint, securing the static pressure tube in adjusted position.

At its upper end, the tube 68 is closed by a plug 75 having an externally ribbed nipple 76 and a passage 77 therethrough leading to the exterior of the tube 68. The lower end of a length of flexible tubing 78 is tightly fitted on the nipple 76 and may be retained in position by a coiled spring 79 encircling the tube on the nipple. The plate 19 which forms the bottom wall of the case 17 is fashioned with an opening which receives a tubular fitting 80. Near the upper end, the fitting 80 is formed with an annular flange 82 adapted to abut against the under surface of the plate 19, and above the flange 81 the fitting 80 is threaded externally to receive a lock nut 81 for securing the fitting in position. The lower end of the fitting 80 is ribbed externally and receives the upper end of the flexible tube 78, the latter being held in position by means of a coiled spring 83 encircling that portion of the tube on the nipple. The upper end of a passage 84 through the tubular fitting 80 opens directly into the side of the case 17. It will be recalled that the case 17 is pressure-tight and houses the pressure-sensitive device 31 which is subjected on its interior to velocity pressure. The tubular means 35 just described functions to subject the interior of the case 17, and thereby the exterior of the pressure-sensitive device 31, to static pressure.

In operation, when the speedometer is mounted on the transom of a boat, for example, the lower forwardly directed end 30' of the Pitot tube 30 should extend sufficiently below the surface of the water to accurately pick up the velocity pressure of water relative to the moving boat. It will be appreciated that the transoms of different boats may be at varying levels above the surface of the water and that, with different loads, the transom of a single boat may be at different levels above the surface of the water. It is for this reason that the Pitot tube 30 is extensibly mounted relative to the larger tube 38. In order for the speedometer to accurately reflect the velocity of a moving boat, it is necessary, of course, that the open end of the forwardly directed portion 30' of the Pitot tube 30 face in the direction of movement of the boat. Generally speaking, a sufficiently accurate velocity is given if the Pitot tube is adjusted so that the forwardly directed end 30' is positioned within 15° of the precise direction of movement of the boat.

It should be understood that the speedometer may or may not employ a sealed speedometer case and the tubular means 35 including the static pressure tube 36. If such a tubular means is not employed and the boat is placed in water with the speedometer mounted thereon and with the Pitot tube extending into water, and allowed to stand overnight, for example, changes in temperature and barometric pressure act freely on the exterior of the pressure sensitive device 31 while the interior of the tubular means 29 and the interior of the pressure sensitive device 31 will not be subjected to the same degree to such changes since the Pitot tube 30 is in water and thus sealed. As a result, the position of the indicating pointer 34 may be altered so that readings thereon are inaccurate unless the tubular means 29 is vented to atmosphere in some manner. The provision of a sealed speedometer case and tubular means 35 serves to provide a sealed chamber surrounding the exterior of the pressure-sensitive mechanism 31 so that in the event changes in temperature and barometric pressure occur under the conditions referred to above, both the interior and the exterior of the pressure sensitive device 31 are subjected to the same conditions. The tube 38 which is enlarged relative to the Pitot tube 30 serves to form an enlarged stabilizing chamber which is comparable in volume to that of the chamber formed by the sealed case 17 and the tubular means 35 so that effects on the interior and exterior of the pressure sensitive device 31 are substantially equal.

Referring now principally to Figs 4, 5 and 6, the pressure-sensitive device 31 and the mechanism 32 for effecting pointer movement are all supported as a unit on a base plate 90 having a depending annular rib 91 formed to receive mounting screws, such as that indicated at 92 in Fig. 1, for securing the base plate 90 on the upper surface of the bottom wall 19 of the case 17. A flat, somewhat elongated leaf spring member 93 is secured adjacent one of its ends to the base plate 90 by means indicated at 94, and is formed with a portion raised off the base plate and sprung so that the end portion 93' tends to move toward the base plate and bears against an adjustment screw 95, the purpose of which will be described more in detail hereinafter.

The pressure-sensitive mechanism 31, previously referred to, comprises a pressure-tight compartment formed of a pair of superposed diaphragms 96 and 97 constructed of a material suitable for the purposes hereinafter described and secured together at their outer peripheries by means such as welding or soldering to form an airtight chamber which is subjected to velocity pressures. The lower diaphragm 97 is provided with a fixed, depending, centrally disposed stud having an enlarged portion 98 immediately beneath the diaphragm 97 and a reduced portion 99 which projects through an opening formed centrally in the leaf spring member 93. The reduced portion 99 of the stud is formed at the end with an enlargement 100, and a spring clip member 101, which is slotted from one end to about its mid-portion, is adapted to be positioned so that the slotted portion embraces the reduced portion 99 of the stud with the mid-portion of the spring clip 101 bearing against the enlargement 100 on the stud, and the end portions of the clip 101 bearing against the underside of the leaf spring member 93 so as to retain the diaphragms forming the pressure-tight compartment securely in position on the member 93.

The stud which projects downwardly from the underside of the lower diaphragm 97 is formed with a passage 102 therethrough leading into the interior of the pressure-tight compartment, and the passage is formed to receive the end of the tube 65 previously described with the passage through the tube in register with the passage 102 formed in the stud so as to subject the interior of the pressure compartment to velocity pressures. The end of the tube 65 may be soldered or otherwise secured in position.

The upper diaphragm 96 is provided with a centrally disposed upwardly projecting stud 104, which is utilized in effecting movement of the speedometer pointer in response to changes in velocity pressure. Since the interior of the pressure compartment formed by the diaphragms 96 and 97 is in communication with the Pitot tube which extends into water during movement of a boat with which the speedometer is used, changes in velocity pressure will either effect expansion or permit contraction of the chamber formed by the diaphragms. Such expansion and contraction of the pressure chamber is permitted by the flexibility of the diaphragms, which are constructed to bend on changes in pressure. Since the lower diaphragm 97 is anchored at its center, no movement of the central portion of the lower diaphragm will occur with changes in pressure. But the outer periphery of the lower diaphragm 97 is free to move upwardly, for example, with increases in pressure. Since the outer periphery of the upper diaphragm 96 is secured to the outer periphery of the lower diaphragm 97, the upper diaphragm 96 will also be moved bodily upward on increases in pressure. But the central portion of the upper diaphragm is not restrained against movement and hence it will move upwardly on increases in velocity pressure, thus transmitting such motion to the vertically extending stud 104.

Since the diaphragms 96 and 97 are constructed, as hereinafter explained, to effect movement of the pointer in increments proportional to the square root of pressure differences, it is desirable that the movement of the stud 104 be entirely vertical, that is, entirely along its own axis, in order that it will accurately reflect movement of the central portion of the diaphragm. For this reason, the diaphragms 96 and 97 are constructed to insure that movement of the stud 104 is entirely vertical. This construction partakes of the provision of corrugations formed concentrically about the center of the diaphragm. The two diaphragms 96 and 97 are essentially identical and as shown at the broken-away portion of the upper diaphragm 96 in Fig. 5, it is provided with corrugations indicated at 105. The provision of such corrugations in the diaphragm eliminates radial bends in the diaphragm and insures that bending of the diaphragm on variations of velocity pressure is confined to lines concentric with the center of the diaphragm to thus obtain only a vertical movement of the stud 104.

In Fig. 10, I have illustrated a pressure compartment constructed of diaphragms 106 and 107 which are analogous to the diaphrams 96 and 97 illustrated in Fig. 5. As seen in Fig. 10, annular corrugations or depressions 108 formed concentrically about the diaphragm center are somewhat pronounced so as to define rather sharp angular bends at 109 relative to the principal plane of the diaphragm, and it is at the angular bends 109 that flexing occurs on changes in velocity pressure within the chamber formed by the diaphragms. This is illustrated in Fig. 10 wherein the full line showing of the diaphragm may, for example, represent its position under conditions when the velocity pressure within the chamber is substantially 0 pounds per square inch. The broken line position of the diaphragm 106 illustrated at 110 indicates the position the diaphragm would assume when the pressure within the chamber is at about 20 pounds per square inch for example; the broken line position illustrated at 111 indicates the position of the diaphragm when the pressure in the chamber is at about 40 pounds per square inch; and the broken line position illustrated at 112 indicates the position of the diaphragm when the pressure is at about 60 pounds per square inch. It will be seen that flexing of the diaphragm in its movement from the full line position to the position illustrated at 112 occurs principally at the relatively sharp bends 109 occurring at the depressions 108 in the diaphragm. Since the depressions 108 are concentric with the center of the diaphragm, it will be apparent that flexing occurs in annular concentric rings, thus assuring movement of the central portion of the diaphragm in a vertical straight line motion, so that a stud, similar to that indicated at 104 in Fig. 5, mounted on the diaphragm 106 would move only along its axis on changes in velocity pressure within the chamber. The movement of the central portion of the diaphragm 106 is thus similar to the movement of the central portion of the diaphragm 96 in Fig. 5.

While in Fig. 10 the movement occurring on changes in pressure within the chamber has been illustrated as if the periphery of the diaphragms were anchored or stationary and the central portions of the diaphragm moved outwardly away from each other, it will be appreciated that when the central portion of the lower diaphragm 107 is anchored as described in connection with the lower diaphragm 97 in Fig. 5, the central portion of the diaphragm 107 will not move. Instead, its outer portion including the periphery will be raised bodily so as to also bodily raise the periphery of the upper diaphragm 106. Hence, the central portion of the diaphragm 106 is subjected to the combined flexing movements of both upper and lower diaphragms.

The diaphragms 96 and 97 in Fig. 5, and the diaphragms 106 and 107 in Fig. 10, may be constructed of a suitable metal material, such as a copper alloy, like beryllium copper, which is heat treated to form a hard, spring-like metal. As mentioned hereinabove, the diaphragms utilized are calibrated so that the increments movement effected at the central portion thereof on variations in velocity pressure are approximately proportionate to the square root of units of variation in velocity pressure. This function is obtained by selecting a material of suitable thickness and flexibility and having a suitable diameter to obtain the desired results. Thus, as illustrated in Fig. 10, it will be seen that on an increase in pressure from 0 to 20 pounds per square inch within the chamber formed by the diaphragms 106 and 107, the central portion of the diaphragm 106 moves from the full line position to the broken line position illustrated at 110; and on a similar increment of pressure increase from 20 to 40 pounds per square inch, the central portion of the diaphragm 106 moves considerably less distance to the broken line position 111; and on a like increment of pressure increase from 40 to 60 pounds per square inch, the central portion of the diaphragm 106 moves still less to the broken line position 112. Thus with substantially equal increments of pressure increase, progressively smaller increments of movements occur at the central portion of the diaphragm 106, and these movements of the central portion of the diaphragm vary approximately as the square root of pressure increases. Thus, if the movement of the central portion of the diaphragm is transmitted in substantially direct proportion to effect movement of the pointer 34 angularly about the speedometer dial, movement of the pointer will vary approximately in direct proportion to velocity increases, so that the graduations on the velocity scales of the speedometer dial may be nearly uniformly spaced over the entire speed range of 0 miles per hour to the maximum velocity readable on the speedometer. It should be understood that the movements of the central portion of the diaphragms 96 and 97 in Fig. 5 correspond substantially to the movements of the central portions of the diaphragms 106 and 107 illustrated in Fig. 10.

Figure 11:
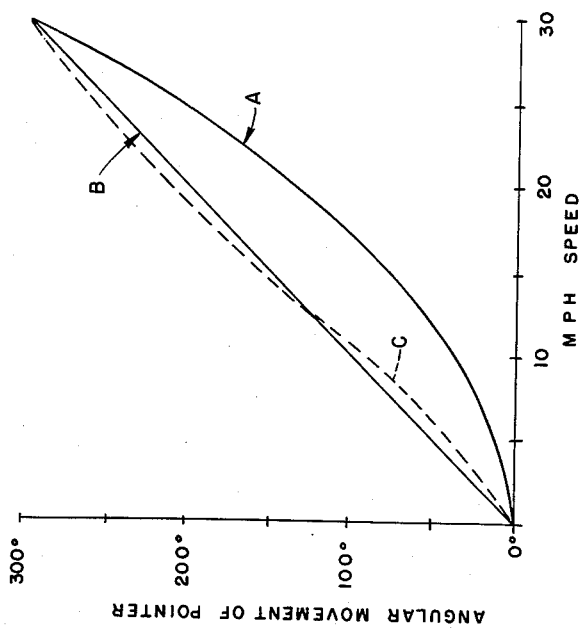
Fig. 11 is a graph including curves illustrating advantages provided by my new speedometer.

The advantages thus obtained with the use of the diaphragms described above are illustrated graphically in Fig. 11 wherein angular movement of the speedometer pointer about the speedometer dial in degrees has been plotted against speed of the boat in miles per hour. The curve A represents angular movement of the speedometer pointer with a speedometer using a Bourdon tube type of pressure sensitive mechanism for effecting movement of the pointer. The curve B represents the desired optimum straight line response; and the curve C represents the measured response obtained with a speedometer utilizing diaphragms constructed according to my invention. It will be seen that the curve C adheres closely to the desired optimum straight line response represented by the curve B, and is markedly nearer the curve B than is the curve A.

Referring again to Figs. 4, 5 and 6 particularly, the mechanism generally designated 32 for effecting movement of the pointer 34 is supported in part by upstanding bosses 115 formed integrally on the base plate 90 and adapted to support a transversely extending support bar 116. The bosses 115 are formed with threaded bores which receive screws 117 for securing the bar 116 in position. A generally U-shaped mounting bracket 118 is supported on the crossbar 116 and may be secured in place by means of screws indicated at 119. The crossbar 116 and the U-shaped bracket 118 are formed with aligned openings which receive reduced end portions of the pointer shaft 33 to thereby journal the shaft for rotation.

The pointer shaft 33 and hence the pointer 34 are biased in a clockwise direction by means of a spiral spring 120 coiled about the shaft and having its inner end secured to the shaft and its outer end secured at 121 to the left leg of the U-shaped mounting bracket 118, as viewed in Figs. 4 and 6. The pressure-sensitive mechanism 31 and the means for effecting movement of the pointer shaft 33 are normally positioned so that the pointer 34 is disposed at the zero point on the speedometer scale on the dial 18 as illustrated in Fig. 2.

Movement of the pointer shaft 33 in a clockwise direction under urge of the spring 120 is permitted on upward movement of the stud 104 on the diaphragm 96 in response to increases of velocity pressure within the chamber formed by the diaphragms. A lever 125 pivotally mounted at 126 on the mounting bracket 118 carries a pivot pin 127 which fits loosely in an oversize hole 128 extending transversely through the stud 104. The loose fitting of the pivot pin 127 in the hole 128 permits arcuate movement of the pivot pin on pivotal movement of the lever 125 while the stud 104 moves vertically in a straight line motion. The opposite end of the lever 125 has connected thereto a flexible member 130, such as a link chain.

At the end of the leaf spring member 93 which is secured to the base plate 90, the spring member is formed with integral extensions 131 and 132 lying in parallel vertical planes. The extensions 131 and 132 support opposite ends of a pivot pin 133 having a pivot sleeve 134 rotatable thereon between the extensions 131 and 132. The sleeve 134 carries a bell crank member welded or otherwise secured thereon and consisting of one arm 135 of a relatively short radius and a longer crank arm 136. As seen in Fig. 4, the relatively short arm 135 is provided with an angularly bent end portion 135' extending toward the extension 131.

As seen best in Fig. 5, the lower end of the flexible chain 130 is connected to the free end of the crank arm 135, and the end of the relatively long crank arm 136 has connected thereto a second flexible member 137 which may comprise a link chain also. The opposite end of the chain 137 is secured to the pointer shaft 33 so that the spring 120 which biases the pointed shaft 33 in a clockwise direction maintains the chain 137 tight, pulls the crank arms 136 and 135 in a clockwise direction, biases the chain 130 downwardly and pulls the lever 125 in a counter-clockwise direction to maintain the pivot pin 127 bearing against the wall of the opening 128 in the stud 104. In this manner, any movement of the stud 104 upwardly as a result of increased pressure on the interior of the diaphragm, results in a proportionate movement of the speedometer pointer 34 under urge of the spring 120. Conversely, any movement of the stud 104 downwardly on decrease of velocity pressure will effect movement of the pointer 34 in a counter-clockwise direction through the medium of the mechanism just described.

At this point, it is believed the function of the adjusting screw 95 previously described will be understood. Since movement of the pointer 34 is dependent upon movement of the stud 104, and since the pressure compartment formed by the diaphragms 96 and 97 is securely mounted on the leaf spring member 93, it will be seen that any adjustment in the position of the free end 93' of the member 93 will also effect an adjustment of the position of the pointer 34. Thus, the adjusting screw 95 may be utilized to adjust the pointer to a desired zero position relative to the dial 18.

The amount of movement of the pointer 34 per unit of movement of the stud 104 may be adjusted by altering the effective radius of the crank arm 135. This may be effected by bending the axially extending portion 135' radially relative to the pivot axis 133. It will be appreciated that any bending of the portion 135' in this manner will alter the effective length of the crank arm 135 to thereby alter the ratio of pointer movement to movement of the stud 104.

The relationship of pointer movement to movement of the stud 104 may also be adjusted so as to alter the sensitivity of pointer movement in the lower portion of the scale on the speedometer dial relative to movement in the upper portion of the scale. This may be accomplished by bending the angularly turned end portion 135' of the crank arm 135 generally circumferentially of its pivot axis 133, and by bending the end portion of lever 125 comparably, adjacent its connection with the chain 130, circumferentially of its pivot axis 126. While bending one of the arms 125 in this manner has the effect, for the moment, of shifting the pointer off the zero position on the scale, the pointer is then returned by also bending the other arm. Bending the arms 135 and 125 in the manner described does not alter their effective length, and the length of the chain 130 is not altered, of course. The net effect is that the pivot sleeve 134, the crank arm 136, and the pointer 34 all remain in the same position, but the arcs through which the end of the crank arm 135 and the end of the lever 125 will move on subsequent velocity pressure variations have been shifted respectively about their pivot axes 133 and 126. Thus, assuming the normal position of the arm 125 is generally horizontal when the pointer is at the mid-portion of the scale (in the vicinity of 15 miles per hour in the case of the dial illustrated), it will be seen that by bending the arm upwardly, and the end portion 135' upwardly, the arc of movement of the end of arm 125 is shifted upwardly, and that this results in decreasing the sensitivity of the pointer movement in the lower portion of the scale, since a greater portion of the arc of movement of arm 125 then occurs above a horizontal plane through the pivot axis 126, and therefore a greater component of its movement is horizontal during movement of the pointer over the lower portion of the scale. But during movement of the pointer over the upper portion of the scale, the end of lever 125 moves through an arc intersecting a horizontal plane through the pivot axis, and thus includes a greater vertical component and provides a greater sensitivity of the pointer in the upper portion of the scale. Conversely, by bending the arms 125 and 135 downwardly the sensitivity of the pointer in moving over the lower portion of the scale may be increased and its sensitivity in the upper portion of the scale decreased.

It will be appreciated that the adjustment provided by the adjusting screw 95, the adjustment provided by bending the arm 135 radially, and the adjustment provided by bending the arms 135 and 125 circumferentially of their pivots, all cooperate to provide a higher degree of efficiency and accuracy in the operation of the mechanism illustrated. At the same time these adjustments permit the use of the associated mechanism in speedometers which utilize diaphragms constructed for operation over a different range of pressures, and permit use of the associated mechanism in speedometers utilizing dials having scales extending through a different total angle or having a different speed range extending over the same or different total angles.

Referring now to Fig. 7, I have illustrated a speedometer utilizing a somewhat modified mounting over that illustrated in Figs. 1 and 3. As illustrated in Fig. 7, the speedometer comprises a mounting bracket 140 of a generally U-shaped configuration including a relatively thin leg 141 and a relatively thick leg 142 and a transversely extending connecting member 143 which are formed to permit mounting of the speedometer on a part of a boat such as a transom. The mounting bracket may then be clamped in position by means of a clamping screw 144 threaded into the lower portion of the relatively thin leg 141. The mounting bracket supports tubular means including a relatively large tube 145 which may be mounted in a bore formed in the relatively thick leg 142 of the mounting bracket and retained therein by means of a set screw 146 in a manner similar to that illustrated in connection with the speedometer of Figs. 1 and 3. The tubular means includes a Pitot tube 147 connected with the relatively larger tube 145 and adapted to extend into water during movement of a vessel on which the speedometer is used. The upper end of the relatively large tube 145 may be connected in a manner similar to that illustrated in Figs. 1 and 3 with a length of flexible tubing 148 adapted to transmit variations in velocity pressure from the Pitot tube to the pressure-sensitive mechanism provided in the speedometer case 149.

The speedometer illustrated in Fig. 7 may utilize a pressure-sensitive device and a mechanism for effecting movement of the pointer 150 similar to that device and that mechanism described in Figs. 1 through 6, and housed in the speedometer case 149 in a manner similar to that illustrated in Figs. 1 through 6. The speedometer case 149 is secured to the upper surface of a flat circular plate 151 formed with a centrally disposed, depending ear 152 which is pivotally supported by means of a pivot pin 153 supported at opposite ends in a pair of upwardly extending ears 154 formed on the upper surface of the mounting bracket 140. In this manner, the speedometer case is adjustably mounted for pivotal movement about the axis of the pivot pin 153 to adjustably position the speedometer case 149 relative to the viewer so that the dial will be readily visible.

The Pitot tube 30 and the static pressure tube 36 illustrated in connection with the speedometer of Figs. 1 through 6 may be constructed of suitable metal material, such as bendable copper tubing, so that in the event either of these tubes strikes an object in the water during movement of the vessel the tube will yield by bending so as to minimize the likelihood of injury to the remainder of the speedometer. Referring now to Fig. 8 also, in the speedometer illustrated in Figs. 7 and 8, the Pitot tube 147 may be constructed of a more rigid material so that on striking an object in the water the tube is not adapted to yield by bending. Instead, the Pitot tube 147 is pivotally supported on the relatively larger tube 145 for movement about an axis normal to the axis of the tubes so as to yield by pivotal movement in the event it strikes an object in the water.

The pivotal connection of the Pitot tube with the tube 145 is provided by forming the lower end portion of the tube 145 of a semi-tubular or half tubular configuration so as to present a flattened surface 156 which, as illustrated, lies in the plane of a diameter through the center of the tube 145. This construction forms an inlet chamber 157 in the lower extremity of the tube 145 connected by a port 158 to the main passage through the tube 145. The flattened wall 156 of the reduced end portion of the tube 145 is formed with a circular inlet opening 159 adapted to rotatably receive the reduced terminus 160 of a hollow head 161 provided on the upper end of the Pitot tube 147. The head 161 may be secured to the upper end of the Pitot tube by means such as welding, or the Pitot tube may be threaded into the head and sealed by adhesive means; in either case, the Pitot tube is mounted such that the passage therethrough communicates with a chamber 162 formed inside the head 161. The head 161 is mounted against the flattened wall 156 with a washer 163 between the two parts to provide a sealed joint. The parts are held in place by means of a bolt 164 and nut 165, with a washer 166 bearing between the head of the bolt and the reduced end portion of the tube 145, and with a washer 167 bearing between the nut 165 and the head 161. The nut 165 may be tightened so that the washers provide a sealed joint, and yet permit pivotal movement of the Pitot tube to yield on striking objects in the water.

The tube 145 is provided with a small outlet 168 opening to atmosphere through the side of the tube. The outlet 168 is positioned so as to be at or near the level of the water when the speedometer is mounted on a boat and the boat placed in water. When the boat with the speedometer mounted thereon is initially placed in water, water rises in the Pitot tube and air trapped inside the Pitot tube and the tube 145, unless permitted to escape, is thereby compressed to an extent sufficient to affect the position of the indicating pointer so that readings taken thereafter from the speedometer may be inaccurate. The outlet opening 168 permits air to escape so that the initial position of the pointer is unaffected.

Additionally, on removing the speedometer from water, unless the tube 145 is vented some water may be retained inside the tube 145 or the Pitot tube 147 by virtue of suction effects inside the tubes. Hence if the speedometer is thereafter tilted to an upside down position any such water may flow to the interior of the pressure sensitive device 31, which, for a number of reasons, is an undesirable condition. The outlet opening 168 functions to vent the tube 145 so as to permit water to flow from the tubes 145 and 147 when the speedometer is removed from the water.

The size of the opening 168 is such that, when the speedometer is in use, any loss of air or water through the opening is inconsequential and does not materially affect the velocity pressure or the accuracy of the speedometer reading.

It will be appreciated that the speedometer of Figs. 1 and 3 may include a pivotal mounting of the Pitot tube and/or the static pressure tube in a manner similar to that illustrated in Figs. 7 and 8 if desired. Also, if the tubular means 35 including the static pressure tube 36 is not utilized in the modification of Figs. 1 and 3, it will be appreciated that such modification may also employ an outlet opening in the tube 38 similar to that illustrated at 168 in Fig. 7.

The modification of Figs. 7 and 8 is the subject matter of divisional application Serial No. 65,528, filed October 27, 1960.

In Fig. 9, I have illustrated another modification which includes a mounting bracket 170 of generally U-shaped configuration similar to that illustrated in Fig. 7, and including a clamping screw 171 for securing the mounting bracket in position on a boat. The mounting bracket 170 supports tubular means including a relatively large tube 172 which may be mounted in a bore formed in the mounting bracket and retained in position by means of a set-screw 173. The upper end of the tube 172 may be connected in a manner similar to that described in Figure 7 to a length of flexible tubing 174 of indefinite length, so that the speedometer case 175, which may include internally mechanism similar to that described in Figs. 1 through 6, may be mounted remotely from the mounting bracket 170. In this manner, the mounting bracket may be positioned on the boat wherever it is most convenient for the Pitot tube to extend into water, and the speedometer case 175 may be mounted where it is most conveniently viewed.

The relatively larger tube 172 has a slightly smaller tube 176 telescopically mounted therein for adjustment angularly and longitudinally relative to the tube 172 and is provided with an outlet 177 opening to atmosphere. The tube 176 has telescopically mounted therein a Pitot tube 178 for adjustment either angularly or longitudinally relative to the tube 176. Fittings 179 and 180 for mounting the tubes 176 and 178 may be similar to either of the fittings for mounting the tubes 30 and 36 illustrated in Fig. 3.

The opening 177 in Fig. 9 functions in a manner similar to that described in connection with the opening 168 illustrated in Fig. 7. The provision of the intermediate relatively large tube 176 and the provision of opening 177 in this tube permits adjustment of the position of the opening 177 relative to the water surface to account for the different elevations of transoms of different boats as well as for the different elevations of the transoms of a single boat under different load conditions.

It should be understood that the speedometer illustrated in Fig. 9 may include features of the speedometers illustrated in Figs. 1 through 8 and 10, and that the speedometer of the latter figures may include features of the speedometer of Fig. 9.

It should now be apparent that I have provided a new and improved speedometer construction which accomplishes the objects set forth at the beginning of the specification.

I claim:

1. In combination, an indicating device having a movable indicating pointer, a pressure sensitive device including an actuator reciprocable in response to variations in pressure to which the pressure sensitive device is subjected, means for subjecting the pressure sensitive device to varying fluid pressure, and means for effecting movement of the pointer in proportion to movement of the actuator including a rotary shaft mounting the pointer, a lever pivotally mounted for movement about a stationary pivot axis and pivotally connected to the actuator at a position spaced from said stationary pivot so that the actuator controls movement of the lever, a flexible non-resilient chain having one end connected to a free end of the lever and extending therefrom in a direction generally normal thereto, a bell crank having one arm connected to the second end of the chain, a flexible non-resilient connector having one end connected to the second arm of the bell crank and having its other end secured to the pointer shaft, and a spring for rotating the pointer shaft to maintain the chain and connector taut, said one arm of the bell crank and said free end of the lever being non-resiliently bendable generally circumferentially of their pivots to shift their arcs of movement while the length of the chain remains constant and the indicating pointer remains unmoved.

2. In combination, an indicating device having a movable indicating pointer, a pressure sensitive device including an actuator reciprocable in response to variations in fluid pressure to which the pressure sensitive device is subjected, means for subjecting the pressure sensitive device to varying fluid pressure, and means for effecting movement of the pointer in proportion to movement of the actuator including a rotary shaft mounting the pointer, a lever pivotally mounted for movement about a stationary pivot axis and pivotally connected to the actuator at a position spaced from the stationary pivot so that the actuator controls movement of the lever, a flexible non-resilient chain having one end connected to a free end of the lever, a bell crank having one arm connected to the second end of the chain, a flexible connector having one end connected to the second arm of the bell crank and having its other end secured to the pointer shaft, and a spring for rotating the pointer shaft to maintain the chain and connector taut, said one arm of the bell crank including a radially extending first portion and at the end thereof a laterally turned axially extending second portion connected to the second end of the chain and non-resiliently bendable radially of the bell crank pivot to alter the effective length of the arm.

3. A marine speedometer, comprising, a pressure-tight speedometer case including an indicating device having a movable part for indicating velocity, a pressure-sensitive mechanism housed in the case for transmitting motion to the movable part, first tubular means connected at one end with the interior of said pressure-sensitive mechanism and having at the other end a Pitot tube extending therefrom to project into the water so as to subject the interior of the pressure-sensitive mechanism to velocity pressure so that changes in velocity pressure effect movement of the movable part to indicate velocity, and second tubular means connected at one end to the interior of said case and having at the other end a static pressure tube extending therefrom to project into the water so as to subject the exterior of said pressure-sensitive mechanism to static pressure, said first tubular means including means forming an enlarged equalizing chamber comparable in volume to the volume of the interior of said case so the volume of the velocity pressure system and the volume of the static pressure system are substantially equal.

4. In combination, an indicating device having a movable indicating pointer, a pressure sensitive device including an actuator reciprocable in response to variations in pressure to which the pressure sensitive device is subjected, means for subjecting the pressure sensitive device to varying fluid pressure, and means for effecting movement of the pointer in proportion to movement of the actuator including a rotary shaft mounting the pointer, a lever pivotally mounted for movement about a stationary pivot axis and pivotally connected to the actuator at a position spaced from said stationary pivot so that the actuator controls movement of the lever, a flexible non-resilient chain having one end connected to a free end of the lever, a bell crank having one arm connected to the second end of the chain, a flexible connector having one end connected to the second arm of the bell crank and having its other end secured to the pointer shaft, and a spring for rotating the pointer shaft to maintain the chain and connector taut, said one arm of the bell crank and said free end of the lever being non-resiliently bendable generally circumferentially of their pivots to shift their arcs of movement while the length of the chain remains constant, and said one arm of the bell crank including a radially extending first portion and at the end thereof a laterally turned axially extending second portion connected to the second end of the chain and bendable radially of the bell crank pivot to alter the effective length of the arm.

5. In combination, an indicating device having a movable indicating pointer, a pressure sensitive device including a stud reciprocable in response to variations in pressure to which the pressure sensitive device is subjected, means for subjecting the pressure sensitive device to varying pressure, and means for effecting movement of the pointer in proportion to movement of the stud including an upright rotary shaft mounting the pointer, a generally horizontal lever having a mid portion pivotally mounted for movement about a stationary pivot axis and having one end pivotally connected to the stud so that the stud controls movement of the lever, a bell crank pivotable about an axis parallel to the lever pivot axis and including first and second crank arms, said first arm including a radially extending first portion and at the end thereof a laterally turned axially extending second portion underlying the second end of said lever, a flexible non-resilient chain having one end connected to the second end of said lever and having its other end conected to the end of said first crank arm, a flexible connector having one end connected to the second crank arm and having its other end connected to the pointer shaft, and a spring for rotating the pointer shaft to maintain the chain and connector taut, said second end of said lever and said second portion of said first crank arm respectively being manually bendable generally circumferentially of their pivot axes thereby to shift their arcs of movement, and said second portion of said first crank arm being bendable radially of the bell crank pivot axis to alter the effective length of the arm.

References Cited in the file of this patent

UNITED STATES PATENTS

| | | |
|---|---|---|
| 1,848,053 | Bacon | Mar. 1, 1932 |
| 1,904,865 | Knobloch | Apr. 18, 1933 |
| 1,989,332 | Munster | Jan. 29, 1935 |
| 2,362,298 | Newell | Nov. 7, 1944 |
| 2,442,722 | Davis | June 1, 1948 |
| 2,524,747 | Ayres | Oct. 10, 1950 |
| 2,534,123 | Hasselhorn | Dec. 12, 1950 |
| 2,627,181 | Kiekhaefer | Feb. 3, 1953 |
| 2,628,501 | Knapp | Feb. 27, 1953 |
| 2,642,743 | Hermanny | June 23, 1953 |
| 2,729,243 | Senn | Jan. 3, 1956 |

FOREIGN PATENTS

| | | |
|---|---|---|
| 1,070,471 | France | Aug. 19, 1952 |